US012663840B2

(12) United States Patent
Yamauchi et al.

(10) Patent No.: US 12,663,840 B2
(45) Date of Patent: Jun. 23, 2026

(54) ELECTRONIC APPARATUS INCLUDING SHIELDED CAMERA MODULE

(71) Applicant: Lenovo (Singapore) Pte. Ltd., Singapore (SG)

(72) Inventors: Takehito Yamauchi, Kanagawa (JP); Masashi Okamoto, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 108 days.

(21) Appl. No.: 18/887,425

(22) Filed: Sep. 17, 2024

(65) Prior Publication Data

US 2025/0190031 A1 Jun. 12, 2025

(30) Foreign Application Priority Data

Dec. 11, 2023 (JP) ................................. 2023-208753

(51) Int. Cl.
*G06F 1/16* (2006.01)

(52) U.S. Cl.
CPC .......... *G06F 1/1686* (2013.01); *G06F 1/1656* (2013.01)

(58) Field of Classification Search
CPC .... G06F 1/1637; G06F 1/1616; G06F 1/1656; G06F 1/1658; G06F 1/1662; G06F 1/1681; G06F 1/1684; G06F 1/1686; H05K 9/0007
See application file for complete search history.

(56) References Cited

U.S. PATENT DOCUMENTS

| | | | | |
|---|---|---|---|---|
| 9,736,931 | B2 * | 8/2017 | Eom ...................... | G06F 1/1652 |
| 11,262,806 | B1 * | 3/2022 | Mizoguchi ............ | G06F 1/1656 |
| 12,517,552 | B2 * | 1/2026 | Kinoshita ............. | G06F 1/1652 |
| 2020/0029475 | A1 * | 1/2020 | Park ...................... | H05K 1/0259 |
| 2022/0163869 | A1 * | 5/2022 | Niu ...................... | G06F 1/1616 |
| 2022/0174386 | A1 * | 6/2022 | Niu ........................ | H04R 19/04 |
| 2023/0300991 | A1 * | 9/2023 | Niu ........................ | H05K 3/305 |

(Continued)

FOREIGN PATENT DOCUMENTS

| | | |
|---|---|---|
| JP | 2014215711 A | 11/2014 |
| JP | 6728450 B1 | 7/2020 |

(Continued)

OTHER PUBLICATIONS

Decision to Grant a patent issued in corresponding Japanese Patent Application No. 2023208753, dated Aug. 6, 2024 (3 pages).

*Primary Examiner* — Abhishek M Rathod

(74) *Attorney, Agent, or Firm* — Osha Bergman Watanabe & Burton LLP

(57) ABSTRACT

An electronic apparatus includes: a camera module which is loaded thereon. The camera module includes: a substrate; a connector unit which is implemented on the substrate; a component which is implemented on the substrate, is adjacent to the connector unit, leaving a gap between the component and the connector unit and that a level difference is formed between the surface thereof and the surface of the connector unit and is equipped with a sheet-shaped member for shielding electromagnetic waves which is so installed as to cover an area which ranges from the surface of the connector unit to the surface of the component, striding over the gap. The sheet-shaped member has a pore on a position where the sheet-shaped member overlaps with the gap vertically.

6 Claims, 7 Drawing Sheets

(56)                    References Cited

U.S. PATENT DOCUMENTS

| | | | | |
|---|---|---|---|---|
| 2023/0407137 A1* | 12/2023 | Hosoya | ................. | G06F 1/1637 |
| 2024/0111335 A1* | 4/2024 | Nakanishi | ............. | G06F 1/1637 |
| 2024/0393828 A1* | 11/2024 | Umejima | .............. | G06F 1/1616 |
| 2024/0393838 A1* | 11/2024 | Nakanishi | .............. | H01R 12/62 |

FOREIGN PATENT DOCUMENTS

| | | | |
|---|---|---|---|
| JP | 2020134751 A | 8/2020 |
| JP | 2022176555 A | 11/2022 |
| JP | 2023030527 A | 3/2023 |

* cited by examiner

ELECTRONIC APPARATUS INCLUDING SHIELDED CAMERA MODULE

CROSS-REFERENCE TO RELATED APPLICATIONS

This application claims priority to Japanese Patent Application No. 2023-208753 filed on Dec. 11, 2023, the contents of which are hereby incorporated herein by reference in their entirety.

TECHNICAL FIELD

The present invention relates to an electronic apparatus that a camera module is loaded.

BACKGROUND

In the electronic apparatus such as a laptop PC, the camera module is loaded on one edge of a chassis that, for example, a display panel is loaded (see, for example, Japanese Patent No. 6728450).

It is necessary to shield the camera module with a member which has electromagnetic shielding property, such as an aluminum sheet, for countermeasures against static electricity and noises. In particular, in the camera module, it is important to shield a connector with which wiring (for example, a flexible substrate) from a motherboard or the like is connected, for example, in order to prevent static electricity from being transmitted from a connector through the wiring and thereby to prevent a motherboard and a CPU and so forth which are implemented on the motherboard from being destroyed.

Incidentally, it is greatly requested to miniaturize and thin the chassis of the electronic apparatus of the above-mentioned type and, therefore, a space for installation of the camera module is limited in the chassis. Accordingly, parts such as lenses, components for processing various kinds of signals and so forth are densely implemented on the substrate of the camera module in addition to the connector. As a result, for example, in a case where the connector is to be covered with an aluminum sheet, other components which are adjacent to the connector get in the way of covering and therefore it is feared that a gap may be created between the aluminum sheet and the connector. This gap becomes a problem in countermeasures against the static electricity and the noises of the connector.

SUMMARY

One or more embodiments of the present invention provide an electronic apparatus which is capable of ensuring the shielding property of the camera module.

The electronic apparatus according to one or more embodiments of the present invention is an electronic apparatus of the type that a camera module is loaded. The camera module includes a substrate, a connector unit which is implemented on the substrate, a component which is implemented on the substrate, is adjacent to the connector unit, leaving a gap between the component and the connector unit and that a level difference is formed between the surface thereof and the surface of the connector unit and is equipped with a sheet-shaped member for shielding electromagnetic waves which is so installed as to cover an area which ranges from the surface of the connector unit to the surface of the component, striding over the gap, and the sheet-shaped member has a pore on a position where the sheet-shaped member overlaps with the gap vertically.

According to one or more embodiments of the present invention, it becomes possible to secure the shielding property of the camera module.

DETAILED DESCRIPTION

In the following, an electronic apparatus according to one or more embodiments of the present invention will be described in detail with reference to the appended drawings.

Figure 1:
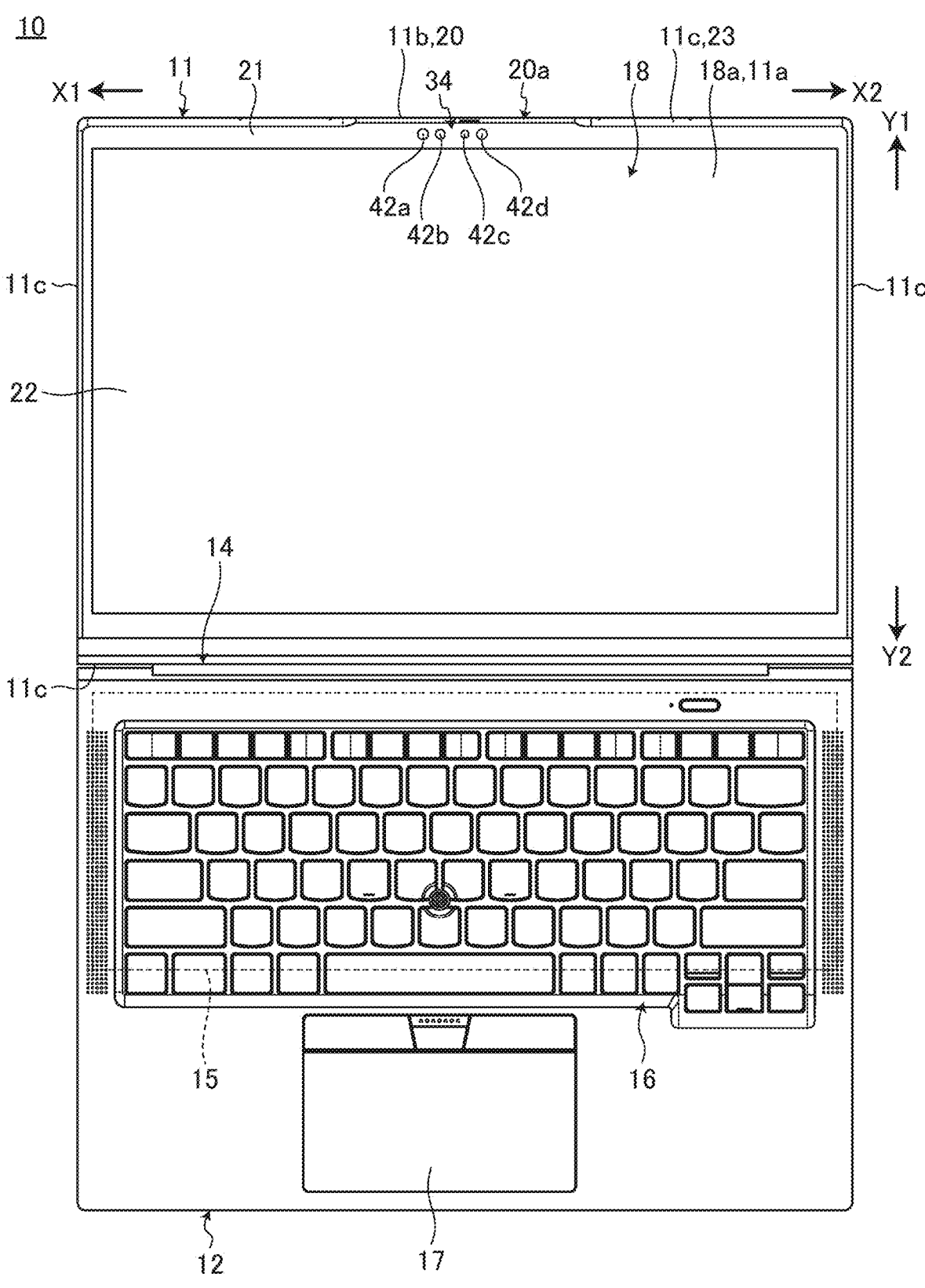
FIG. 1 is a schematic plan view illustrating one example that the electronic apparatus according to one or more embodiments is viewed from above.

FIG. 1 is a schematic plan view illustrating one example that an electronic apparatus 10 according to one or more embodiments is viewed from above. As illustrated in FIG. 1, the electronic apparatus 10 according to one or more embodiments is a clamshell-type laptop PC and has a configuration that a first chassis 11 and a second chassis 12 are coupled together by a hinge 14 to be relatively rotationally movable. Although the electronic apparatus 10 of the laptop PC is exemplified in one or more embodiments, the electronic apparatus may be, for example, a tablet type PC, a display device, a smartphone and/or a portable gaming machine and so forth, other than the laptop PC.

The second chassis 12 is a flat box body and is adjacent to the first chassis 11. Various kinds of electronic components such as a motherboard 15 that a CPU and so forth are loaded, a storage device, and a battery device are housed in the second chassis 12. A keyboard 16 and a touch pad 17 face onto an upper surface of the second chassis 12.

The first chassis 11 is a flattened box body which is thinner than the second chassis 12. The first chassis 11 loads a display panel 18 thereon. In the following, an explanation will be given by calling width directions as X1 and X2 directions respectively, height directions as Y1 and Y2 directions respectively, thickness directions as Z1 and Z2 directions respectively, setting up a direction which is viewed from an operator who visually recognizes a display surface 18a of the display panel 18 as a standard. There are cases where the X1 and X2 directions are called an X direction altogether and there are cases where also the Y1 and Y2 directions and the Z1 and Z2 directions are called a Y direction and a Z direction similarly.

The display surface 18a of the display panel 18 faces a Z1-side surface (a front surface 11a) of the first chassis 11. The first chassis 11 has a chassis member 20 which forms a back face 11b (a Z2-side surface) and a periphery side face 11c and a vessel member 21 which forms a peripheral edge of the front surface 11a. The vessel member 21 is a frame-shaped thin plate which surrounds an outer peripheral edge part of the display panel 18. Almost the entire surface of the front surface 11a of the first chassis 11 which also includes the vessel member 21 is covered with touch glass 22. The hinge 14 is coupled to a Y2-side edge part of the first chassis 11.

The display panel 18 is configured by, for example, a liquid crystal display and an organic EL display. The display panel 18 has a structure that, for example, a sheet of glass, a liquid crystal layer, a light guide plate and so forth are laminated and mutual outer peripheral edge parts of the respective layers are fixed with a double-sided tape, an adhesive and so forth. The touch glass 22 configures the touch panel which accepts a touching operation which is performed to the display panel 18 by covering the display surface 18a.

Figure 2:
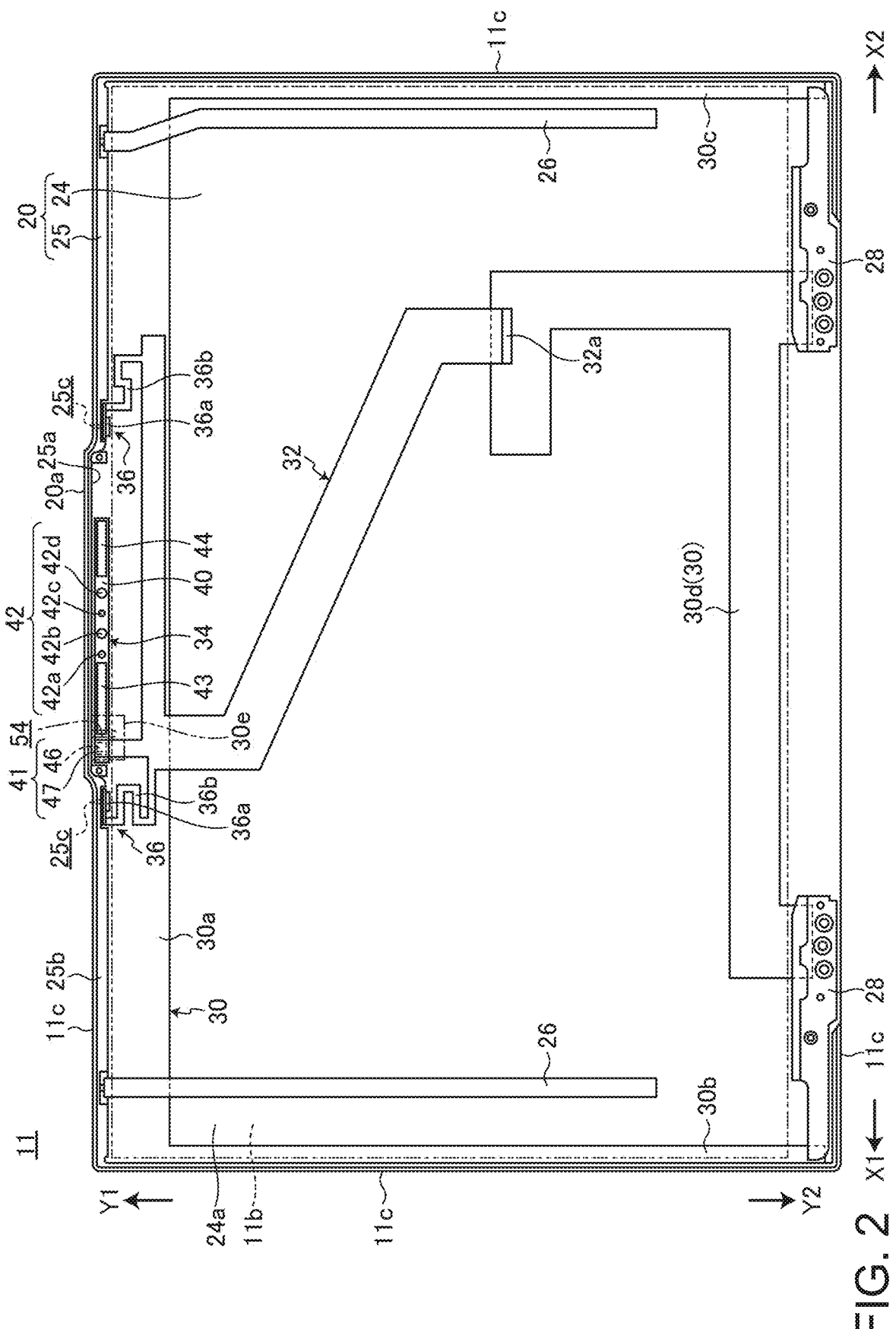
FIG. 2 is a plan view schematically illustrating one example of an internal structure of a first chassis.

FIG. 2 is a plan view schematically illustrating the inner structure of the first chassis 11. In FIG. 2, illustration of the touch glass 22 and the vessel member 21 is omitted and only the external shape of the display panel 18 is indicated by a two-dot chain line.

As illustrated in FIG. 2, the chassis member 20 has a plate unit 24 and a vertical wall 25 which is so installed as to stand up from an outer peripheral edge of the plate unit 24. The plate unit 24 is a rectangular plate and forms the rear face 11b of the first chassis 11. The plate unit 24 is, for example, a flat plate, a shallow dome-shaped plate which is slightly curved toward the side of the back face 11b or the like. The vertical wall 25 is a wall part which stands up from an outer peripheral edge of the plate unit 24 in the Z1 direction and forms each side face 11c of the first chassis 11. A Z1-side surface (an upper end face 25b) of the vertical wall 25 serves as an adhesive surface of the vessel member 21 (see FIG. 6). A reference numeral 20a in FIG. 1 and FIG. 2 denotes a protruding part which is formed by projecting an almost central portion of the Y1-side edge part of the chassis member 20 in the Y1 direction. The protruding part 20a serves to enlarge a space for installation of the camera module 34 which will be described later. The protruding part 20a may be omitted.

The chassis member 20 has, for example, a configuration that a resin frame which configures the vertical wall 25 is bonded to the edge of the plate unit 24 which is, for example, a laminated plate of a carbon fiber reinforced resin by injection molding. The chassis member 20 may also have a configuration or the like that the plate unit 24 and the vertical wall 25 are integrally molded with the use of the same metal material, resin material or the like.

As illustrated in FIG. 2, a double-sided adhesive tape 26, a bracket 28, an electroconductive sheet 30, a wiring unit 32, a camera module 34 and a microphone module 36 are attached to the inside of the chassis member 20.

The double-sided adhesive tape 26 is a belt-shaped tape which is provided in the form of, for example, one pair of left and right tapes and extends in the Y direction. The double-sided adhesive tape 26 is adapted to fix the display panel 18 to the chassis member 20. The double-sided adhesive tape 26 adhesively fixes a rear face which is located on the opposite side of the display surface 18a of the display panel 18 and an inner face 24a (a rear-side surface of the back face 11b) of the plate unit 24 together.

One pair of left and right brackets 28 is installed along, for example, a Y2-side edge of the first chassis 11 and each is adhesively fixed to the inner surface 24a. The bracket 28 is a metal component which is adapted to clamp the hinge 14 with a screw. The bracket 28 is electrically connected with the second chassis 12 via the metal hinge 14.

The electroconductive sheet 30 is a thin single-side adhesive sheet which is formed by using a highly electroconductive material such as, for example, aluminum or copper. The electroconductive sheet 30 in one or more embodiments is an aluminum sheet (an aluminum tape). The electroconductive sheet 30 is adhered to the inner surface 24a of the plate unit 24. It is possible to use the electroconductive sheet 30 as a frame ground of the display panel 18, the camera module 34 and the microphone module 36 and is electrically connected with the second chassis 12 via the bracket 28.

Figure 3:
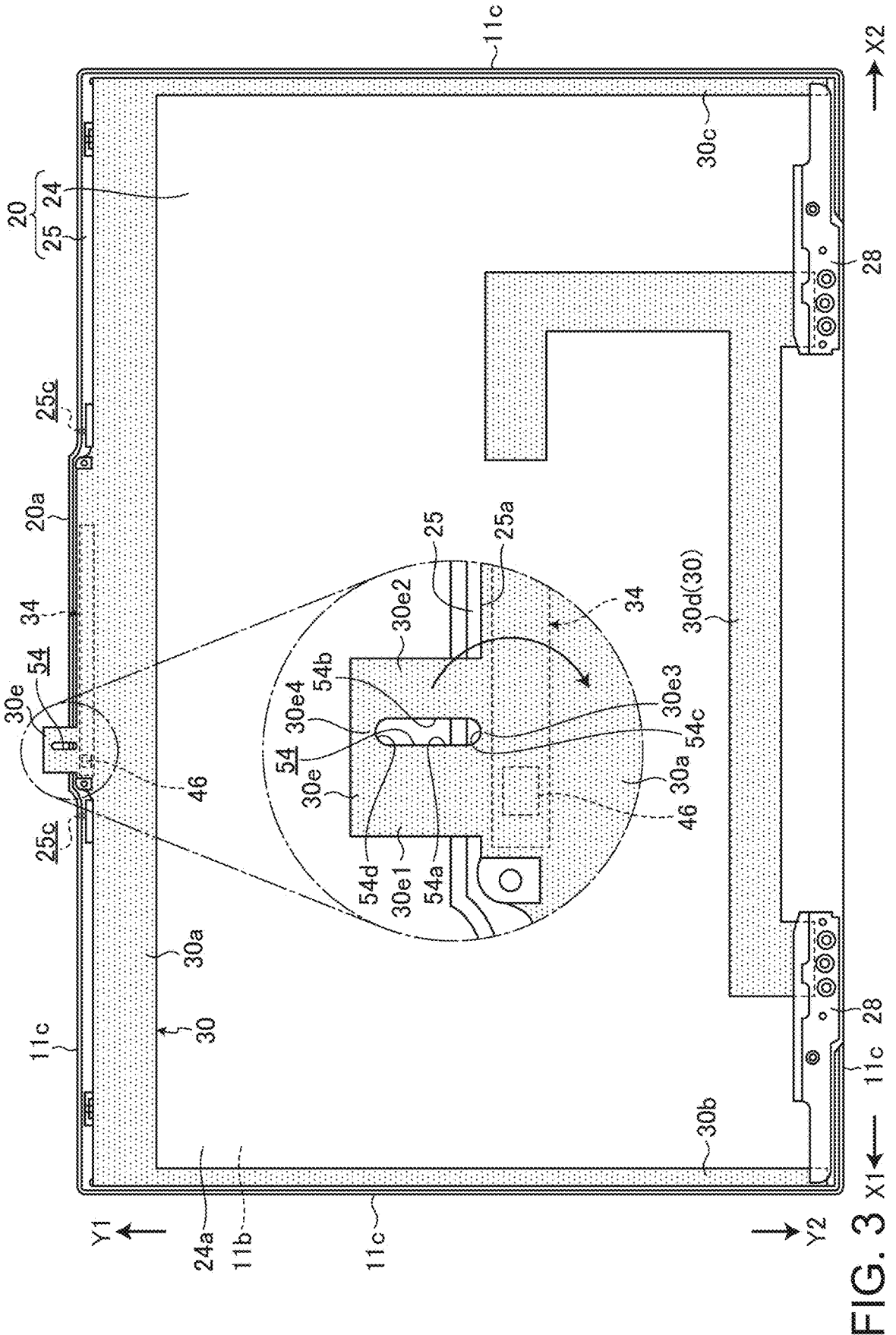
FIG. 3 is a diagram illustrating one example of the arrangement of an electroconductive sheet which is illustrated in FIG. 2.

FIG. 3 is a diagram illustrating one example of the arrangement of the electroconductive sheet 30 which is illustrated in FIG. 2. In FIG. 3, the electroconductive sheet 30 is clearly indicated by applying a dotted pattern.

As illustrated in FIG. 2 and FIG. 3, the electroconductive sheet 30 in one or more embodiments has a first part 30a to a fifth part 30e. The first part 30a to a third part 30c are installed along respective edges on the Y1, X1 and X2 sides of the plate unit 24 and are formed into an upside down almost U-shaped form as a whole. The first part 30a extends in the X direction along a Y1-side edge of the plate unit 24. A second part 30b extends in the Y direction along an X1-side edge of the plate unit 24 and a Y2-side end thereof is connected to the bracket 28. A third part 30c extends in the Y direction along an X2-side edge of the plate unit 24 and a Y2-side end thereof is connected to the bracket 28. A fourth part 30d is installed on a position which is closer to the Y2 side than to the center of the plate unit 24 and is formed into a sideway-oriented almost J-shaped form. The fourth part 30d is connected to a relay connector 32a of the wiring unit 32 and the left and right brackets 28 respectively. In one or more embodiments, the parts 30b to 30d may be jointly fastened to the bracket 28 with screws for fixing the hinge 14 to the bracket 28 so as to surely conduct them relative to the bracket 28.

The fifth part 30e is a small piece-shaped part which projects from a position which is opposite to the camera module 34 in a longitudinal direction (the X direction) of the first part 30a to the Y1 side. The fifth part 30e is bent to the Z1 side along a wall face (an inner wall face) 25a of the vertical wall 25 and then is folded back to the Y2 side (see FIG. 6). Thereby, the fifth part 30e is so installed as to connote a part of the camera module 34. A concrete configuration of the fifth part 30e will be described later.

As illustrated in FIG. 2, the wiring unit 32 is configured by a wide flexible substrate (FPC: Flexible printed circuits). The wiring unit 32 is placed on the inner face 24a of the plate unit 24 and a Z1-side surface of the electroconductive sheet 30 which is adhered thereto. The wiring unit 32 is part of wiring for connecting the camera module 34 and the microphone module 36 to the mother board 15 which is installed on the side of the second chassis 12. The wiring unit 32 is a unit that a flexible substrate 47 of the camera module 34 which will be described later is gathered together with a flexible substrate 36b of each microphone module 36. The relay connector 32a which is connected to a predetermined relay board is implemented on a Y2-side end of the wiring unit 32. The wiring unit 32 is connected with the mother board 15 via this relay board. The wiring unit 32 may be directly connected with the mother board 15 with no intervention of the relay board.

A microphone module 36 builds a stereo microphone by being installed in the form of one pair of left and right ones. Only one microphone module 36 may be also used. The microphone module 36 has a microphone element 36a. The microphone element 36a is, for example, a MEMS microphone which shields a MEMS chip and an IC chip which each has a vibrating membrane which is implemented on, for example, a printed substrate (PCB: Printed Circuit Board). A microphone pore 25c is formed through the vertical wall 25 on a position where the microphone module 36 faces. The microphone element 36a is adhesively fixed to a wall face 25a of the vertical wall 25 and thereby it becomes possible to acquire sound information on the outside of the first chassis 11 via the microphone hole 25c. The microphone element 36a in one or more embodiments is implemented on the flexible printed circuit (FPC) 36b. The flexible substrate 36b is wiring for connecting together the microphone element 36a and the wiring unit 32.

As illustrated in FIG. 2, the camera module 34 in one or more embodiments includes a substrate (a camera substrate) 40, a connector unit 41, a lens unit 42 and component units 43 and 44.

The substrate 40 is a printed circuit board (PCB). The substrate 40 is a thin belt-shaped plate which is narrow in width in the Z direction and is long in the X direction. The connector unit 41, the lens unit 42 and the component units 43, 44 are implemented so as to line up on one surface (a Z1-side surface) of the substrate 40 in the X direction.

It is possible for the connector unit 41 to include a connector 46 and a flexible substrate (FPC) 47. The connector 46 is implemented on an X1-side end of the substrate 40. The connector 46 is, for example, a board-to-board connector (a B-to-B connector). A connection terminal is formed on an upper surface (the Z1-side surface) 46a of the connector 46 and the flexible substrate 47 is connected to this connection terminal (see FIG. 5). The upper surface 46a is a surface which is provided on the opposite side of a mounting surface (a Z2-side surface) of the connector 46 relative to the substrate 40. The flexible substrate 47 is wiring for connecting together the camera module 34 and the wiring unit 32.

It is possible for the lens unit 42 to include an illuminance sensor 42a, a camera lens 42b, a status LED 42c and an IRLED 42d (also see FIG. 1). The illuminance sensor 42a is a sensor which is capable of sensing the brightness of surrounding environments. The camera lens 42b is a camera lens which can be used for video shooting and so forth, has a lens for light collection at the center and an image sensor is installed on the rear side of the lens. The status LED 42c is a light emitting element which is capable of displaying an operating state of the electronic apparatus 10. The IRLED 42d is an infrared camera which can be used for face recognition and so forth. The configuration of the lens unit 42 is not limited thereto.

The component unit 43 is arranged between the connector unit 41 and the lens unit 42. The component unit 43 is capable of including various kinds of components 43a which are implemented on the substrate 40 and a shield case 43b which covers these components 43a (see FIG. 4A and FIG. 5). Each component 43a is capable of including, for example, a semiconductor chip which processes a signal which is sent from the camera lens 42b to the connector 46, a semiconductor chip for use as a power source of the camera module 34 and so forth. The shield case 43b is a case for shielding electromagnetic waves of the component 43a and is, for example, an aluminum box-shaped case.

The component unit 44 is arranged on the X2 side of the lens unit 42. The component unit 44 may have a configuration which is the same as the configuration of the component unit 43, that is, can be so configured as to surround the various kinds of components with a shield case.

In the camera module 34, the connector unit 41 is a unit that electromagnetic wave shielding is necessary for taking countermeasures, in particular, against static electricity and noises. For example, in a case where the static electricity is generated in the connector unit 41, it is feared that the static electricity would be transmitted from the flexible substrate 47 to the motherboard 15 in the second chassis 12 via the wiring unit 32 and would destroy a CPU and so forth. In addition, in a case where noises that various constitutional elements of the camera module 34 generate are transmitted to the connector 46, it is also feared that image quality may be degraded. Accordingly, the connector unit 41 in one or more embodiments is covered with the first part 30a of the electroconductive sheet 30 on the Z2 side (the substrate 40 side) and with the fifth part 30e on the Z1 side (the surface 41a side).

Next, a concrete shielding structure of the connector unit 41 will be explained.

Figure 4A:
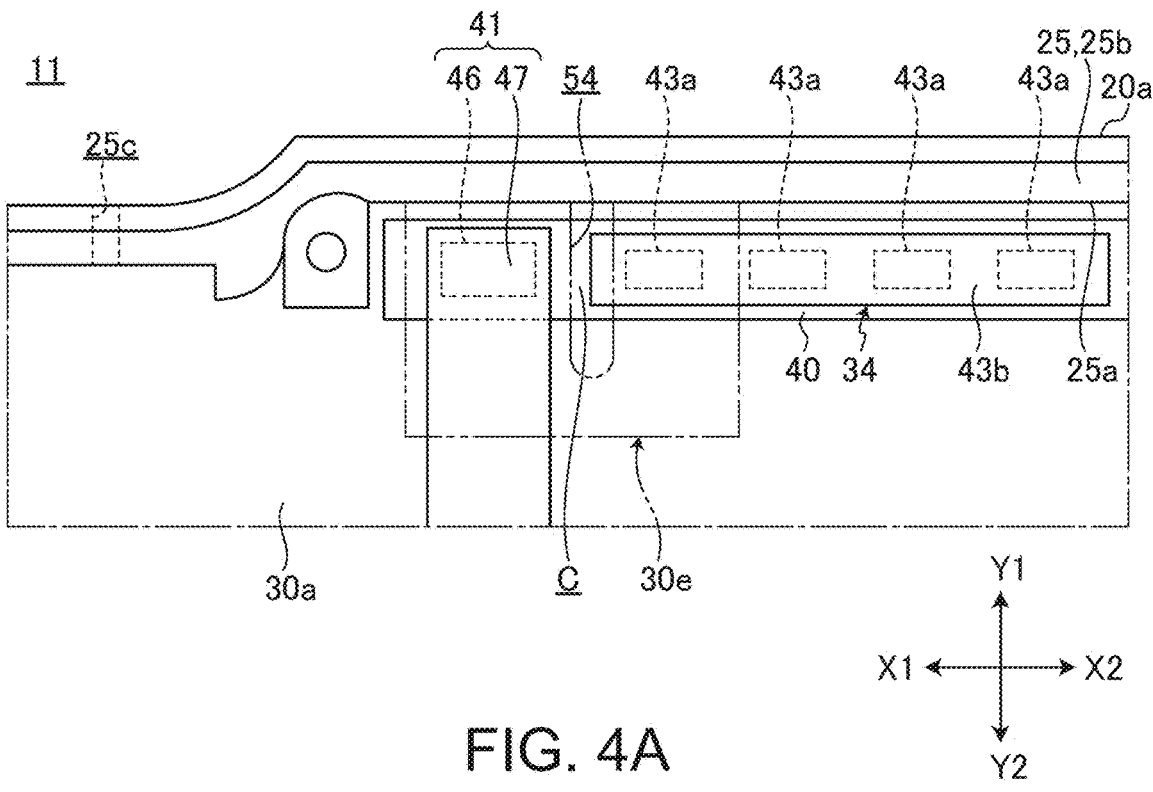
FIG. 4A is an enlarged diagram illustrating one example of a connector unit and a peripheral area thereof which are illustrated in FIG. 3.
Figure 4B:
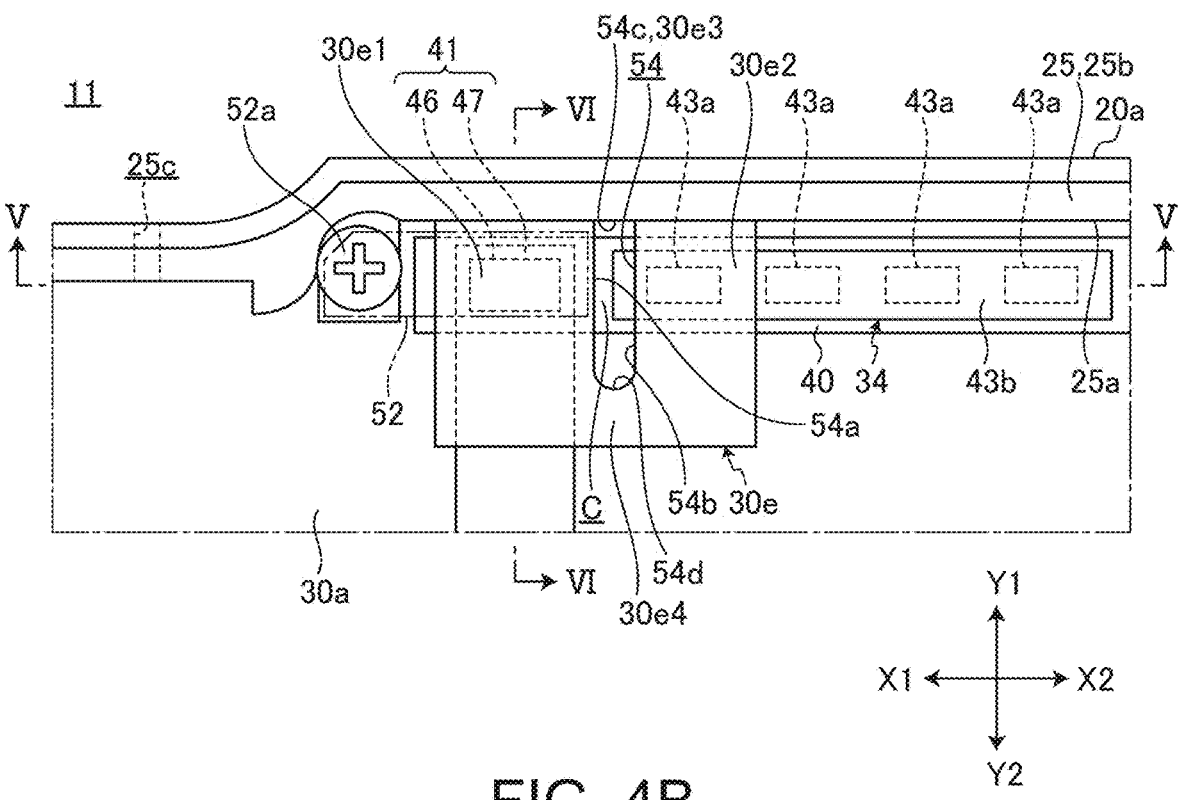
FIG. 4B is a diagram illustrating one example of a state that the connector unit which is illustrated in FIG. 4A is covered with a fifth part (a sheet-shaped member).
Figure 5:
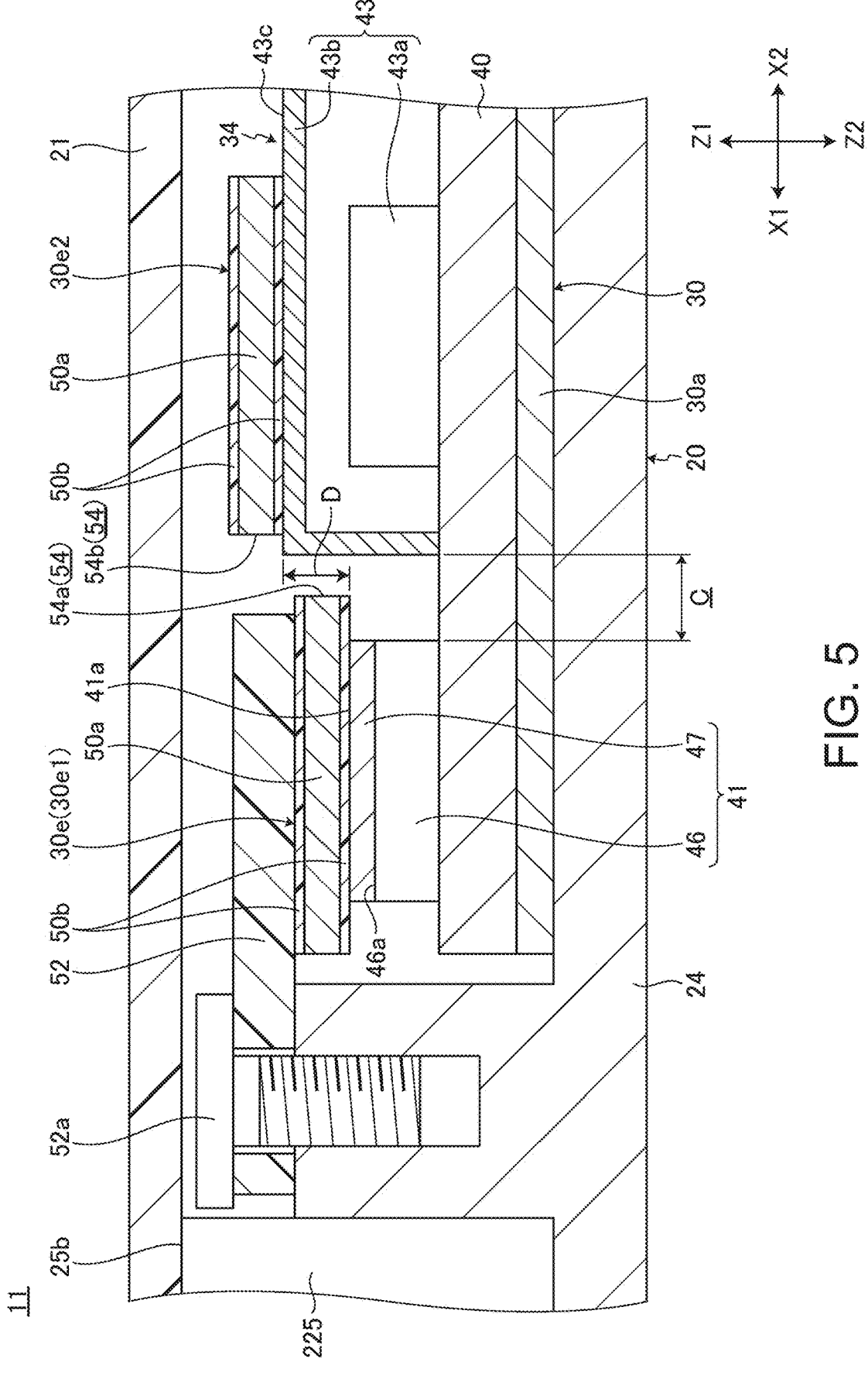
FIG. 5 is a schematic sectional diagram along the V-V line in FIG. 4B.
Figure 6:
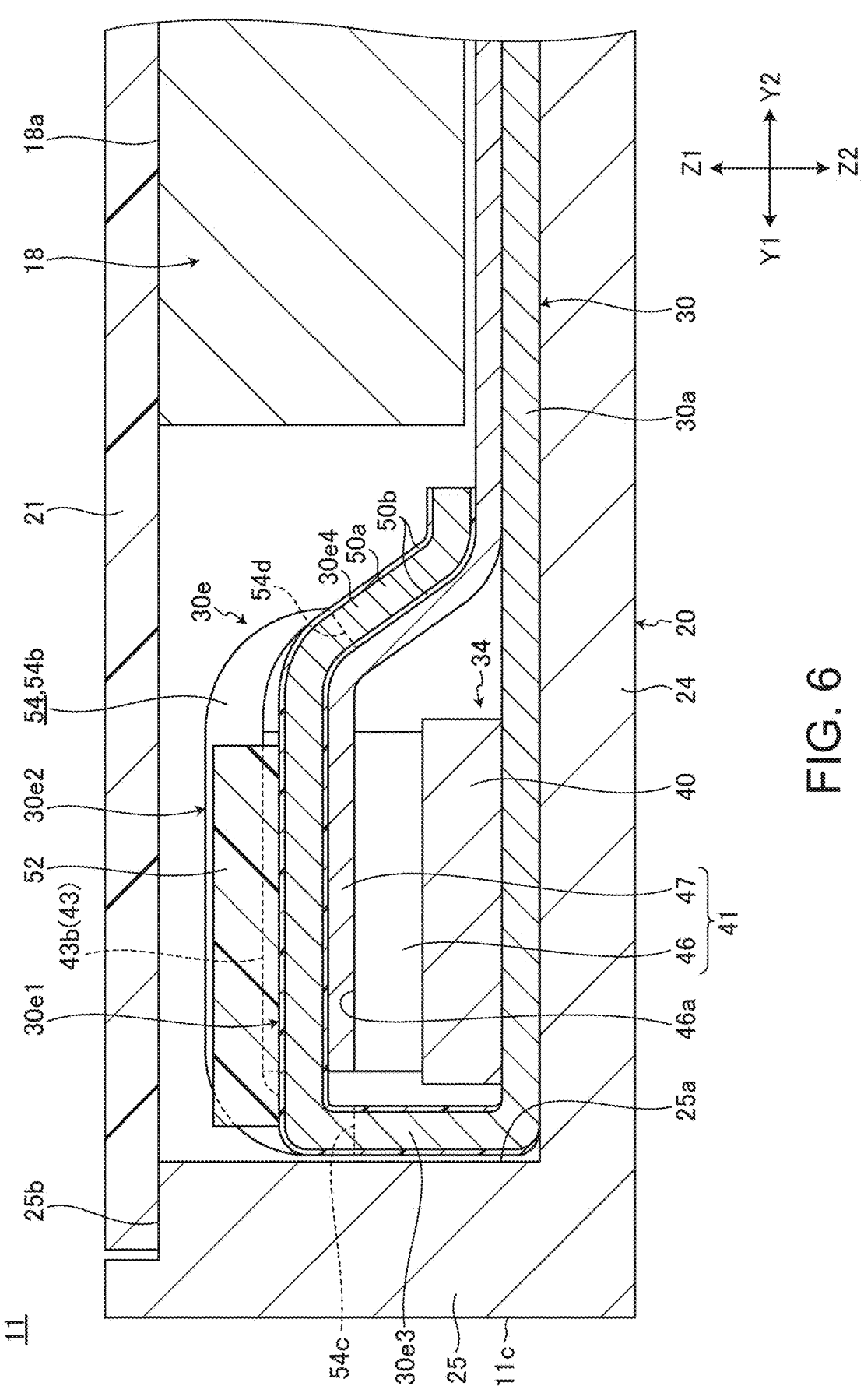
FIG. 6 is a schematic sectional diagram along the VI-VI line in FIG. 4B.

FIG. 4A is an enlarged diagram illustrating one example of the connector unit 41 and surroundings thereof which are illustrated in FIG. 3. In FIG. 4A and FIG. 3, only the external shape of a fifth part 30e is illustrated with a two-dot chain line and illustration of a pressing member 52 is omitted. FIG. 4B is a diagram illustrating one example of a state that the connector unit 41 which is illustrated in FIG. 4A is covered with the fifth part 30e. FIG. 5 is a schematic sectional diagram along the V-V line in FIG. 4B. FIG. 6 is a schematic sectional diagram along the VI-VI line in FIG. 4B.

As illustrated in FIG. 3, the fifth part 30e of the electroconductive sheet 30 is so formed as to protrude from a Y1-side edge of the first part 30a in a Y1 direction in a state which is taken before covering the connector unit 41. As illustrated in FIG. 4A to FIG. 6, when covering the connector unit 41, the fifth part 30e is bent to the Z1 side along the wall surface 25a of the vertical wall 25 and then is folded back to the Y2 side. Thereby, it becomes possible for the fifth part 30e to cover the connector unit 41 so as to connote it.

As illustrated in FIG. 3 to FIG. 6, the fifth part 30e is configured by a three-layered sheet-shaped member which has a shield layer 50a and insulating layers 50b and 50b which cover the both surfaces of the shield layer 50a. In the following, there are cases where the fifth part 30e is called the "sheet-shaped member 30e". The shield layer 50a is part of the electroconductive sheet 30 which is formed integrally with the first part 30a and is, for example, an aluminum sheet. The insulating layer 50b is made of a resin which has insulating property and flexibility, for example, polyimide. The insulating layer 50b is installed in order to prevent the camera module 34 from being short-circuited by the shielding layer 50a. The sheet-shaped member (the fifth part) 30e which has a three-layered structure such as the above is thicker than other parts 30a to 30d by the amount of the two-layered insulating layer 50b and, therefore, is reduced in flexibility.

As illustrated in FIG. 4A to FIG. 5, the sheet-shaped member 30e is so installed as to cover an area which ranges from a surface 41a of the connector unit 41 to part of a surface 43c of the component unit 43 which is adjacent to the connector unit 41. The sheet-shaped member 30e is so installed as to cover not only the connector unit 41 but also up to the component unit 43 mainly for following reasons.

First, a crevice C between the connector unit 41 and the component unit 43 is very narrow for the purpose of miniaturization of the camera module 34. The crevice C is, for example, about 1 mm. Accordingly, it is difficult for the sheet-shaped member 30e to cover only the connector unit 41. On the other hand, it is necessary for the sheet-shaped member 30e to prevent formation of a crevice which serves as a path of noises and so forth between it and the connector unit 41. Therefore, the sheet-shaped member 30e is so installed as to cover an area up to the component unit 43 together with the connector unit 41 and to suppress formation of the crevice around the connector unit 41 to the greatest possible extent.

As illustrated in FIG. 4B to FIG. 6, it is also possible for the electronic apparatus 10 to install the pressing member 52 which presses the sheet-shaped member 30e from above and to press the flexible substrate 47 against the connector 46. The pressing member 52 is a member for preventing the connector 46 and the flexible substrate 47 from being disconnected. The pressing member 52 is a rod-shaped member which is made of, for example, resin, metal and so forth. The pressing member 52 in one or more embodiments is a resin rod. The pressing member 52 is clamped to an upper surface of a boss part which stands upward from an inner surface 24a of the chassis member 20 with a screw 52a and projects in the X2 direction. Thereby, it becomes possible for the pressing member 52 to hold down the connector unit 41 to the Z2 side from above the sheet-shaped member 30e.

As illustrated in FIG. 5, a level difference D is formed between the surface 41a of the connector unit 41 and a surface 43c of the component unit 43. Specifically, the height from the surface of the substrate 40 to the surface 43c of the component unit 43 is higher than the height from the surface of the substrate 40 to the surface 41a of the connector unit 41.

In the camera module 34, heights of the component units 43, 44 and the lens 42 are mutually different between a case where, for example, the resolution is compatible with a USB video class (UVC: USB Video Class) that, for example, the resolution ranges from about 720×480 pixels to about 1920×1200 pixels and a case where the resolution is compatible with 4K which is higher than this in resolution. The height of the component unit 43 and the height of the lens unit 42 are also different from each other also depending on each manufacturer. On the other hand, it is possible to configure the connector unit 41 with the use of a thin-type connector 46 which conforms to the predetermined connection standard and it is possible to use connectors which are common in height even in a case where the resolutions and the manufactures are mutually different. Therefore, the level difference D is formed between the surfaces 41a and 43c. Incidentally, the arrangement of respective constitutional elements of the camera module 34 may be appropriately changed. For example, the lens unit 42 may be arranged adjacently to the connector unit 41.

Figure 7:
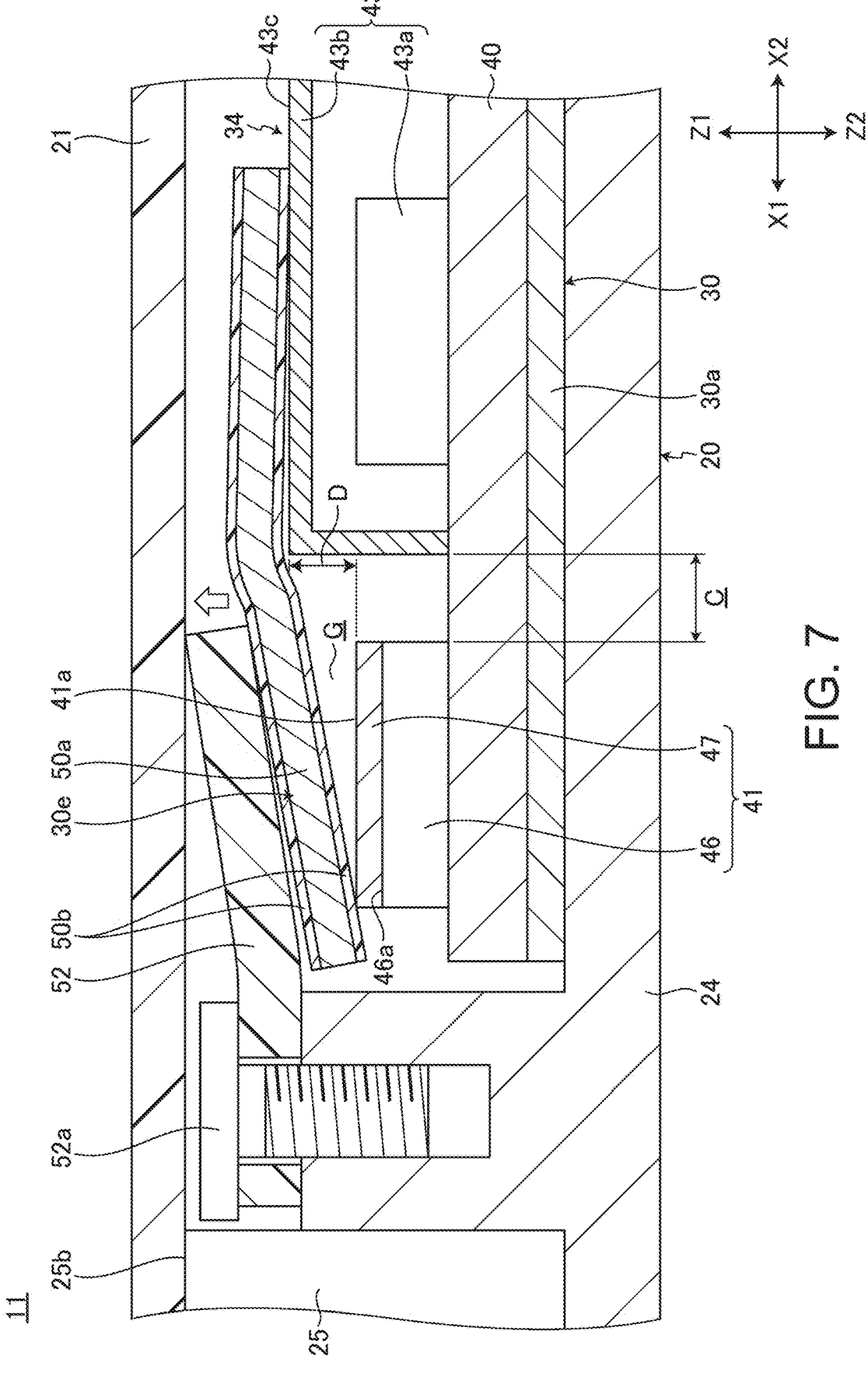
FIG. 7 is a schematic side sectional diagram showing one example of a state that the connector unit is covered with a sheet-shaped member which has no pore portion in a comparative example.

Here, a result of an experiment that a configuration that the surfaces 41a and 43c are covered with the sheet-shaped member 30e which does not have a pore 54 which will be described later has been discussed with no consideration of the above-described level difference D will be explained. In this case, as illustrated in FIG. 7, it has been found that the sheet-shaped member 30e is stretched to the Z1 side just like a tent above (the Z1 side) a clearance C between the surfaces 41a and 43c due to the presence of the level difference D. In particular, the sheet-shaped member 30e has the above-described three-layered structure. Accordingly, the sheet-shaped member 30e is thicker than the other portions 30a to 30d of the electroconductive sheet 30 and is low in flexibility. Accordingly, it becomes more difficult for the sheet-shaped member 30e to follow the level difference D and is more liable to be stretched to a tent-like form above the clearance C. Therefore, in this configuration, it has been found that a large gap G is generated between the sheet-shaped member 30e which has inflated at a portion which strides over the clearance C and the surrounding of the connector unit 41 and therefore it has been found that it is feared that the gap G would become a passage of noises and so forth. Further, it has been also found that the sheet-shaped member 30e which has stretched depresses the pressing member 52 to the Z1 side and deforms it. In this case, it is also feared that the pressing member 52 would not only loss the pushing action of the connector unit 41 but also interfere with the vessel member 21 and peel the vessel member 21.

Therefore, the sheet-shaped member 30e in one or more embodiments has the pore 54 for suppressing to stretch between the surfaces 41a and 43c.

As illustrated in FIG. 3 to FIG. 6, the pore 54 is an elongated pore which is provided in the vicinity of the center of the sheet-shaped member 30e in the X direction and is elongated in the Y direction. The pore 54 is installed on a position where it partially overlaps with the clearance C vertically (the Z direction). It is necessary for the pore 54 to be able to split the sheet-shaped member 30e into two parts substantially in the X direction on a part where it strides over the clearance C. An X1-side part 30e1 is a part which covers the connector unit 41. An X2-side part 30e2 is a part which covers part of the component unit 43. Incidentally, the parts 30e1 and 30e2 are fixed to the surfaces 41a and 43c with, for example, a double-sided adhesive tape.

Thereby, the lower-side part 30e1 is pulled by the upper-side part 30e2 in the Z direction and thus stretching of the sheet-shaped member 30e to the Z1 side into a tent-like form is suppressed. Accordingly, it becomes possible for the sheet-shaped member 30e to surely cover the surface 41a of the connector unit 41 and its surroundings with no gap.

More specifically, in one or more embodiments, the pore 54 may be present on a position where a side edge 54a on the X1 side projects to the X2 side beyond an X2-side side face of the connector unit 41 (see FIG. 4B and FIG. 5). Thereby, it becomes possible for the sheet-shaped member 30e to cover the surface 41a of the connector unit 41 and its surroundings with the X1-side portion 30e1 more surely. Incidentally, a side edge 54b on the X2 side is located on a position which draws back to the X2 side beyond an X1-side side face of the component unit 43.

In one or more embodiments, a Y1-side end 54c of the pore 54 may be located on the Z1 side beyond the upper face 46a of the connector 46 (see FIG. 6). In other words, in one or more embodiments, the pore 54 may be not arranged between the connector 46 and the wall face 25a of the vertical wall 25 for the purpose of surely arranging the shield layer 50a on the Y1 side of the connector 46 so as to increase the shielding performance to the connector 46. From the view point of the shielding performance, the end 54c may be located on the Z1 side beyond the surface 41a of the connector unit 41 which also includes the flexible substrate 47 in one or more embodiments. However, since the surface of the flexible substrate 47 is covered with an insulating material, electromagnetic shielding of the type which is observed in the connector 46 is not essential. Accordingly, it is sufficient for the end 54c to be located on the Z1 side at least beyond the upper surface 46a of the connector 46. Consequently, the shielding performance of the connector

46 is more improved while the sheet-shaped member 30e continuously secures the absorption performance of the level difference D owing to presence of the pore 54.

It is sufficient for the Y2-side end 54d of the pore 54 to be located on a position where it does not hinder the absorption performance of the level difference D owing to presence of the pore 54. It is sufficient that the end 54d be located on, for example, the Y2 side beyond the Y2-side side face of the connector unit 41 (see FIG. 6).

There is no limitation on the size of the pore 54. In the case of one or more embodiments, the X-direction width of the sheet-shaped member 30e is, for example, about 15 mm and the X-direction width of the pore 54 is, for example, about 1 mm to 3 mm, and 2 mm in one or more embodiments. In addition, in one or more embodiments, the sheet-shaped member 30e may slightly increase the X-direction width of a part 30e1 which covers the connector unit 41 more than the width of a part 30e2 for attaining the shielding performance. For example, the X-direction width of the part 30e1 is about 7.5 mm and the X-direction width of the part 30e2 is about 5 mm.

As described above, the electronic apparatus 10 according to one or more embodiments includes the sheet-shaped member 30e for shielding the electromagnetic waves which is so installed as to cover other components of the camera module 34, for example, ranging from the surface 41a of the connector unit 41 of the camera module 34 to other components of the camera module 34, for example, up to the surface 43c of the component unit 43, striding over the clearance C which has the level difference D. The sheet-shaped member 30e has the pore 54 on the position where it overlaps with the clearance C vertically. Accordingly, in the electronic apparatus 10, tent-like stretching of the sheet-shaped member 30e between the connector unit 41 and another component (the component unit 43) which is adjacent thereto is suppressed. Therefore, it becomes possible for the sheet-shaped member 30e to cover the connector unit 41 more tightly with no gap and thereby to secure the shielding property of the camera module 34. In other words, it is not necessary for the electronic apparatus 10 to use the sheet-shaped member 30e separately depending on differences in resolution of the camera module 34 and among product manufactures and it becomes possible to suppress component costs.

In addition, the sheet shaped member 30e is configured to follow the step difference D by the pore 54 whose peripheral area is surrounded by the shield layer 50a. That is, in order to make it follow the step difference D, for example, it is also conceivable to form a notch in the YI direction from the side of the edge (the Y2-side edge in FIG. 4B) which is opposite to a part which is linked with, for example, the first part 30a and thereby to form the portions 30e1 and 30e2. However, in this case, it is feared that the shield layer 50a would be segmentalized by the Y2-side edge of the sheet-shaped member 30e and thereby this part would serve as a path of noises. In particular, in a case where the shield layer 50a is segmentalized in this way, there is also possibility that when assembling it in a factory, there is also a possibility that a worker would open the portions 30e1 and 30e2 in a skirt-like form from a notch and fix them and thereby the shielding performance is more degraded. In this respect, the sheet-shaped member 30e in one or more embodiments has bridge portions 30e3 and 30e4 which respectively connect together the left and right portions 30e1 and 30e2 on the outer sides of the both ends 54c and 54d of the pore 54. Therefore, in the sheet-shaped member 30e, the shield layers 50a of the portions 30e1 and 30e2 are mutually connected and thereby more higher shielding performance is obtained.

In particular, the camera module 34 is higher in the height from one surface of the substrate 40 to the surface 43c of another component (the component unit 43) than the height from one surface of the substrate 40 to the surface 41a of the connector unit 41. Accordingly, the camera module 34 is more liable to for the gap G such as that which is illustrated in FIG. 7 between the sheet-shaped member 30e and the connector unit 41. In this respect, it becomes possible for the electronic apparatus 10 to more surely shield the connector unit 41 which is lower in height than other components which are adjacent thereto owing to provision of the pore 54 in the sheet-shaped member 30e.

Incidentally, the present invention is not limited to the above-described embodiments and it is a matter of course that it is freely changeable within a range not deviating from the gist of the present invention.

DESCRIPTION OF SYMBOLS

10 electronic apparatus
11 first chassis
18 display panel
20 chassis member
21 vessel member
25 vertical wall
30 electroconductive sheet
30e fifth part (sheet-shaped member)
34 camera module
36b, 47 flexible substrate
40 substrate
41 connector unit
42 lens unit
43, 44 component unit
46 connector
52 pressing member
54 pore

What is claimed is:

1. An electronic apparatus comprising:
   a camera module comprising:
     a substrate;
     a connector unit which is implemented on the substrate; and
     a component which is implemented on the substrate and is adjacent to the connector unit, such that a gap is formed between the component and the connector unit and that a level difference is formed between a surface of the component and a surface of the connector unit; and
   a sheet-shaped member, for shielding electromagnetic waves, installed so as to cover an area which ranges from the surface of the connector unit to the surface of the component, striding over the gap, wherein
   the sheet-shaped member has a pore on a position where the sheet-shaped member overlaps with the gap vertically.

2. The electronic apparatus according to claim 1, wherein a height from the substrate to the surface of the component is higher than a height from the substrate to the surface of the connector unit.

3. The electronic apparatus according to claim 1, further comprising:
   a chassis on which a vertical wall is installed on its edge so as to support the camera module; and
   an electroconductive sheet which is adhered to an inner surface of the chassis, wherein the camera module faces a wall surface of the vertical wall, and the sheet-shaped member is:

formed integrally with the electroconductive sheet, bent from the inner surface of the chassis along a wall surface of the vertical wall, and folded back from the wall surface of the vertical wall toward the camera module and to cover the surface of the connector unit and the surface of the component.

4. The electronic apparatus according to claim 3, wherein the connector unit comprises:

a connector which is implemented on the substrate; and a flexible substrate which is connected to the connector, and the electronic apparatus further comprises a pressing member which presses the sheet-shaped member from above and presses the flexible substrate against the connector.

5. The electronic apparatus according to claim 4, further comprising:

a display panel which is supported by the chassis; and a vessel member that strides over a space between an outer peripheral edge of a display surface of the display panel and an upper end face of the vertical wall, wherein the pressing member is disposed under the vessel member.

6. The electronic apparatus according to the claim 3, wherein the connector unit comprises:

a connector which is implemented on the substrate; and a flexible substrate which is connected to the connector, and the pore is not disposed between the connector and the wall surface of the vertical wall.

\* \* \* \* \*